United States Patent

[11] 3,561,601

| [72] | Inventor | William H. McNeely<br>San Diego, Calif. (c/o Ara-Chem. Inc., 808<br>Gable Way, El Cajon, Calif. 92020) |
|---|---|---|
| [21] | Appl. No. | 869,015 |
| [22] | Filed | Oct. 24, 1969 |
| [45] | Patented | Feb. 9, 1971 |

[54] OIL SLICK DISPERSION APPARATUS
3 Claims, 2 Drawing Figs.

[52] U.S. Cl. ................................................. 210/242,
114/0.5
[51] Int. Cl. ..................................................... C02b 9/02,
E02b 15/04
[50] Field of Search ............................................ 210/59, 40,
242, 198; 169/1, 2; 114/0.5, 232—234; 239/172

[56] References Cited
UNITED STATES PATENTS

| 707,636 | 8/1902 | Proskey .......................... | 114/233 |
| 924,128 | 6/1909 | Babcock ......................... | 114/0.5 |
| 969,440 | 9/1910 | Askew ............................ | 114/0.5 |
| 1,644,972 | 10/1927 | Zeitter ........................... | 169/25 |
| 3,220,482 | 11/1965 | Eveleth .......................... | 169/2X |

FOREIGN PATENTS

| 931,594 | 7/1963 | Great Britain ................. | 210/242 |

*Primary Examiner*—Michael Rogers
*Attorney*—Knox & Knox

ABSTRACT: An oil slick on a body of water is dispersed by a specially equipped boat which is driven through the slick to separate and concentrate the oil on the boat's bow wave. From nozzles on opposite sides of the boat near the bow, a mixture of water and a chemical dispersant is directed against the oil as a high pressure jet in a cyclically oscillating path sweeping across the bow wave generally perpendicular to the direction of travel. The rate of oscillation is sufficiently fast to apply the dispersant over all of the oil in the vicinity of the boat and due to the particular oscillating action, a concentration of dispersant is applied close to the boat where the oil is heaviest on the bow wave.

PATENTED FEB 9 1971　　　　　　　　　3,561,601

INVENTOR.
WILLIAM H. McNEELY
BY
Knox & Knox

OIL SLICK DISPERSION APPARATUS

BACKGROUND OF THE INVENTION

The present invention relates to decontamination of water and specifically to apparatus for dispersing an oil slick.

A large oil slick on a body of water, caused by an oil well leak, a damaged tanker, or other such circumstances, is difficult to clean up before considerable damage is done to marine life and shore line property. Techniques used include floating barriers, chemicals, straw, which is used to soak up oil and then disposed of, and other laborious and time consuming methods. Chemicals are usually applied by spraying and are used in concentrations which have damaging after effects in the water. In dealing with very large oil slicks, all of the above methods have been found inadequate.

SUMMARY OF THE INVENTION

The apparatus described herein permits rapid dispersion of an oil slick over a large area with minimum contamination of the water. A boat is driven in a predetermined path through the oil slick, the bow wave of the boat separating and concentrating the oil along the sides of the boat. Mounted on opposite sides of the boat near the bow are nozzles which are movable, manually or by power means, to oscillate cyclically with a swinging action generally perpendicular to the length of the boat. On the boat is a supply of chemical dispersant, which is mixed in a controlled ratio with water pumped from the main body of water, and ejected under high pressure from the nozzles. The nozzle action sweeps the dispersant across the oil in a wide path on both sides of the boat, with the dispersant applied more heavily near the boat where the oil is concentrated on the bow wave. At each pass of the boat a wide swath is cut through the oil and, due to the efficient application technique, emulsification takes place and the ratio of dispersant to water can be very low, resulting in minimum contamination of the water.

DESCRIPTION OF THE PREFERRED EMBODIMENT

Figure 1:
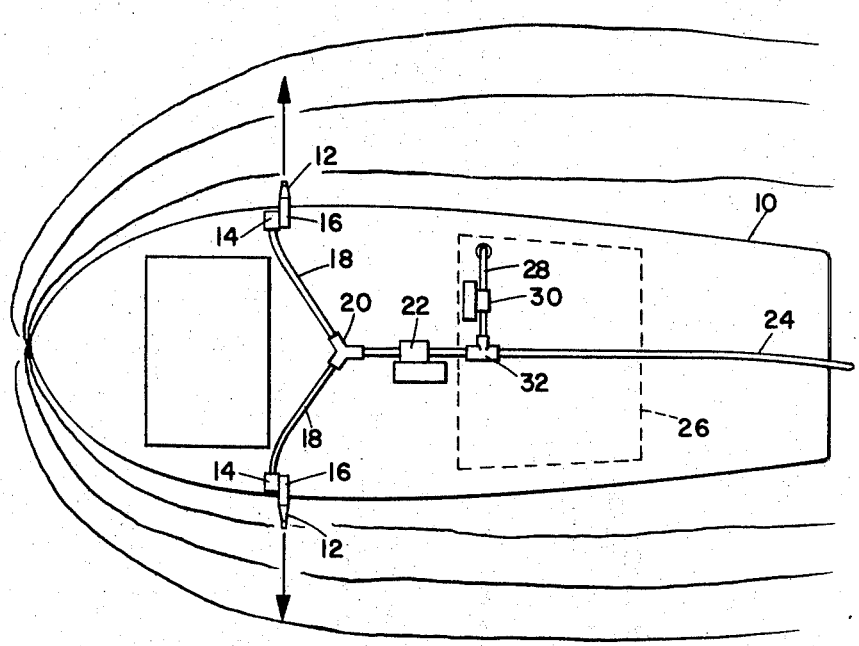
FIG. 1 is a top plan view of a typical boat with the apparatus installed.

The most suitable type of boat for the operation is one having a broad beam and a blunt bow, in order to achieve effective separation of the oil into a wide bow wave. As an example, a boat with a 25 foot beam moving at 3 to 6 miles an hour, will push a 20 to 25 foot wide path of disturbed oil on each side. When the oil is properly treated, this results in a clear path at least 60 feet wide cut through the oil in a single pass. The high pressure jets cause an emulsification of the oil not achieved by any other known method. This emulsification with accompanying turbulence is accentuated also by the increased volume of the diluted dispersant.

The apparatus carried on the boat 10, includes a pair of hose nozzles 12 mounted on opposite sides near the bow. For proper control the nozzles 12 are mounted on suitable supports 14 and are pivoted to swing in vertical planes substantially perpendicular to the length of the boat. The nozzles may be on the deck as shown or on superstructure of the boat, to obtain the required coverage and freedom of operation. The nozzles may be manually operated, but for prolonged use at the required operating rates are preferably actuated by water powered monitor attachments 16. Such monitors are well known and provide a timed cyclic sweeping action of the nozzles over a preset range. In this instance the nozzles are operated to sweep a jet of water and dispersant over substantially the width of the bow wave disturbance as indicated in the full line and broken line positions in FIG. 2; the actual swept area depending on several factors.

Nozzles 12 are connected by supply hoses 18, through a branch coupling 20 to a primary pump 22, which has a pickup hose 24 extending into the main body of water below or clear of the oil. As shown, dispersant is carried in barrels 26 suitably secured on the after deck, but could be in any form of tank or container carried on or built into the boat. A dispersant pickup hose 28 carries the dispersant to an injection pump 30 which is coupled to an injection T-fitting 32 in hose 24 at the inlet side of primary pump 22. Additional nozzles may be used if necessary, water powered or manually operated for handling oil patches or missed spots.

The chemical dispersant most suited to the apparatus is sold under the trade name of Gold Crew Dispersant by Ara Chem, Inc. and is compatible with fresh or salt water. Water can thus be obtained directly from the main body, eliminating the need for water storage on the boat, as is required with some techniques. Due to the method of application the dispersant can be highly diluted. It has been found that a ratio of one part of dispersant to 40 parts of sea water will effectively disperse heavy oil, and this may be reduced to a ratio of one part dispersant to 80 parts of water. This compares to ratios on the order of one to four using light spray or other techniques.

In operation the boat is driven steadily through the oil, while the nozzles are swung with a cyclic oscillation to spray a jet in a generally zigzag pattern across the oil. To avoid gaps the nozzles must swing at a constant rate corresponding to the speed of the boat. At normal operating speeds the rate will be from 1 to 2 complete out and in cycles a second, which is quite rapid. The water and dispersant mixture is delivered at high pressure, in the range of 150 to 200 p.s.i. at a rate of 40 to 150 gallons a minute from each nozzle, depending on oil thickness, speed and other factors. The jets thus strike the oil with considerable impact, breaking the oil up into microscopic particles with an emulsifying action and spreading the particles through the water. The jets need not be closely confined, but can be made divergent to some extent by adjustment of the nozzles to suit particular conditions and to ensure coverage of the area being treated. Water turbulence continues the spreading and what was a film of oil on the surface is spread through a considerable depth of water. Once broken up in this manner there is no tendency for the oil to collect again and the water is clear. At the high dilutions of dispersant used, the post operation dispersant concentration in the water is well within the stringent requirements of the Federal Water Pollution Control Administration.

Figure 2:
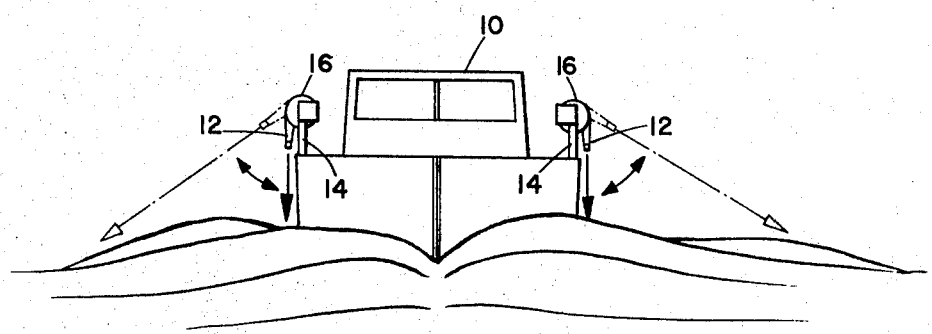
FIG. 2 is a front view of the boat showing the action of the nozzles.

An important aspect of the technique is the particularly effective application of the nozzle action to the distribution of oil on the bow wave of the boat. It will be obvious that the oil will be more concentrated close to the boat where the water is piled up higher in the wave, and diminishes in concentration outwardly from the boat. The nozzle motion, as indicated in FIG. 2 is from a near vertical position directed down the side of the boat to an angularly outward position. With a constant nozzle motion the effective sweeping speed of the jet is slower adjacent the boat, with a stop and reversal at the inner end of the stroke. Thus the dispersant application is heaviest in the area of maximum oil concentration.

The apparatus makes it possible to disperse oil in rough water and windy conditions, which would break up floating barriers and prevent light sprays from boats or aircraft from being effective. By making repeated, slightly overlapping passes, one boat can clear a very large area in a short time and can be taken very close to shore when necessary, without the danger of spraying wind blown dispersant over shoreline property.

I claim:
1. Oil slick dispersion apparatus, comprising:
   a powered boat capable of producing a wide bow wave and concentrating floating oil along the sides of the boat;
   a pair of nozzles mounted on opposite sides of the boat and being pivotal to swing in generally vertical planes downwardly and laterally substantially beamwise of the boat, to sweep across the bow wave;

a pressurized source of diluted oil dispersant connected to said nozzles, said pressurized source and nozzles being means producing high pressure jet action against said bow wave to cause emulsification of the oil in said bow wave; and including mechanical means attached to said nozzles swinging the nozzles at a substantially constant rate of rapid cyclic oscillation; on the order of 1 to 2 complete cycles per second.

2. Oil slick dispersion apparatus, comprising;

a powered boat capable of producing a wide bow wave and concentrating floating oil along the sides of the boat;

a pair of nozzles mounted on opposite sides of the boat and being pivotal to swing in generally vertical planes downwardly and laterally and substantially beamwise of the boat, to sweep across the bow wave;

a pressurized source of diluted oil dispersant connected to said nozzles, said pressurized source and nozzles being means producing high pressure jet action against said bow wave to cause emulsification of the oil in said bow wave, said source including a primary pump having an outlet connected to said nozzles, and an intake having water pick up means in the body of water on which the boat is supported and having the capability of greatly increasing the volume of the sprayed liquid; and said source of diluted oil dispersant being connected to the intake side of said primary pump.

3. The structure of claim 2 and including injection means at the intake side of said primary pump, and a controlled rate injection pump between said source of dispersant and said injection means.